United States Patent
Tessier, Jr.

(10) Patent No.: US 12,351,075 B2
(45) Date of Patent: Jul. 8, 2025

(54) PREDICTIVE E-BURN TO MANAGE ENERGY STORAGE FOR IMPROVED REGENERATIVE BRAKING

(71) Applicant: FCA US LLC, Auburn Hills, MI (US)

(72) Inventor: Raymond J Tessier, Jr., Onsted, MI (US)

( * ) Notice: Subject to any disclaimer, the term of this patent is extended or adjusted under 35 U.S.C. 154(b) by 204 days.

(21) Appl. No.: 18/342,249

(22) Filed: Jun. 27, 2023

(65) Prior Publication Data

US 2025/0001871 A1 Jan. 2, 2025

(51) Int. Cl.
| | | |
|---|---|---|
| B60L 7/18 | (2006.01) | |
| B60L 15/20 | (2006.01) | |
| B60L 50/60 | (2019.01) | |
| B60L 58/12 | (2019.01) | |
| B60L 1/00 | (2006.01) | |
| B60L 7/26 | (2006.01) | |

(52) U.S. Cl.
CPC .............. B60L 7/18 (2013.01); B60L 15/20 (2013.01); B60L 50/60 (2019.02); B60L 58/12 (2019.02); B60L 1/00 (2013.01); B60L 7/26 (2013.01); B60L 2240/54 (2013.01); B60L 2240/622 (2013.01); B60L 2240/64 (2013.01); B60L 2240/70 (2013.01)

(58) Field of Classification Search
CPC ........ B60L 1/00; B60L 15/20; B60L 15/2045; B60L 2240/54; B60L 2240/62; B60L 2240/622; B60L 2240/64; B60L 2240/642; B60L 2240/70
See application file for complete search history.

(56) References Cited

U.S. PATENT DOCUMENTS

| | | | |
|---|---|---|---|
| 8,433,494 B2 | 4/2013 | Vogel | |
| 8,789,472 B2 | 7/2014 | Mai | |
| 9,815,451 B2 * | 11/2017 | Dextreit | B60W 20/40 |
| 9,821,662 B2 | 11/2017 | Nada et al. | |
| 11,524,686 B2 * | 12/2022 | Plianos | B60W 50/14 |
| 2022/0261012 A1 * | 8/2022 | Ladurini | G01W 1/10 |

FOREIGN PATENT DOCUMENTS

JP 2013233051 A 11/2013

* cited by examiner

*Primary Examiner* — Tyler J Lee
(74) *Attorney, Agent, or Firm* — Jeremy J. Klobucar

(57) ABSTRACT

Predictive energy storage management techniques for an electrified vehicle obtaining a set of global positioning satellite (GPS) and map data and, based on the set of GPS and map data, detect an upcoming regeneration region that the electrified vehicle will encounter, predict a regenerative energy that a regenerative braking system of the electrified vehicle can generate across the regeneration region, determine a target stored energy for the energy storage system of the electrified vehicle based on the predicted regenerative energy, control one or more electric motors of an electrified powertrain of the electrified vehicle to intentionally deplete the energy storage system to the target stored energy by the start of the regeneration region, and control the regenerative braking system to recharge the energy storage system to a desired level during and by the end of the regeneration region.

20 Claims, 2 Drawing Sheets

PREDICTIVE E-BURN TO MANAGE ENERGY STORAGE FOR IMPROVED REGENERATIVE BRAKING

FIELD

The present application generally relates to electrified vehicles and, more particularly, to techniques for predictive electrified burn (e-burn) to manage energy storage for improved regenerative braking.

BACKGROUND

An electrified vehicle has an electrified powertrain including one or more battery systems that provide electrical energy (i.e., current) to one or more electric motors. For plug-in hybrid electrified vehicles (PHEVs), the battery system(s) are periodically recharged via roadside or residential charging stations. Recharging is also often performed during operation of the electrified vehicle. Regenerative braking is one primary energy capture and storage technique utilized by electrified vehicles. There are situations, however, when the electrified vehicle's battery system state of charge (SOC) is at full or near-full charge and an extended downhill region is encountered. In such situations, the conventional friction brakes would need to be applied because there is nowhere for regenerative braking energy to go (and thus is released as heat energy). This could result in excessive wear of the electrified vehicle's friction brakes. Accordingly, while such conventional energy storage control techniques do work well for their intended purpose, there exists an opportunity for improvement in the relevant art.

SUMMARY

According to one example aspect of the invention, a predictive energy storage management system for an electrified vehicle is presented. In one exemplary implementation, the predictive energy storage management system comprises a set of sensors configured to obtain a set of global positioning satellite (GPS) and map data associated with a current trip of the electrified vehicle and a controller configured to receive, from the set of sensors, the set of GPS and map data and, based on the set of GPS and map data, detect an upcoming regeneration region that the electrified vehicle will encounter, the regeneration region satisfying a set of criteria, predict a regenerative energy that a regenerative braking system of the electrified vehicle can generate across the regeneration region, determine a target stored energy for the energy storage system of the electrified vehicle based on the predicted regenerative energy, control one or more electric motors of an electrified powertrain of the electrified vehicle to intentionally deplete the energy storage system to the target stored energy by the start of the regeneration region, and control the regenerative braking system to recharge the energy storage system to a desired level during and by the end of the regeneration region.

In some implementations, the controller controls the regenerative braking system such that its maximum amount of kinetic energy is captured during the regeneration region. In some implementations, the controller is configured to operate the one or more electric motors of the electrified powertrain as negative/drag torque applicators. In some implementations, the desired level for the energy storage system is within a threshold amount from fully charged. In some implementations, the GPS and maps data includes a route that the electrified vehicle is traveling and a set of road parameters associated with each a plurality of road segments comprising the route.

In some implementations, the energy storage system is a high voltage battery system and the target stored energy is a target state of charge (SOC) of the high voltage battery system. In some implementations, the controller is configured to utilize the regenerative braking system during an entirety of the regeneration region and not utilize a conventional friction braking system of the electrified vehicle during the regeneration region. In some implementations, the controller is configured to not intentionally enable one or more accessory loads of the electrified vehicle to intentionally further enable regenerative braking during the regeneration region. In some implementations, the electrified vehicle is an extended range electrified vehicle (EREV). In some implementations, the EREV is a pickup truck.

According to another example aspect of the invention, a predictive energy storage management method for an electrified vehicle is presented. In one exemplary implementation, the predictive energy storage management method comprises receiving, by a controller and from a set of sensors, a set of GPS and map data associated with a current trip of the electrified vehicle, based on the received GPS and map data, detecting, by the controller, an upcoming regeneration region that the electrified vehicle will encounter, the regeneration region satisfying a set of criteria, and predicting, by the controller, a regenerative energy that a regenerative braking system of the electrified vehicle can generate across the regeneration region, determining, by the controller, a target stored energy for the energy storage system of the electrified vehicle based on the predicted regenerative energy, controlling, by the controller, one or more electric motors of an electrified powertrain of the electrified vehicle to intentionally deplete the energy storage system to the target stored energy by the start of the regeneration region, and controlling, by the controller, the regenerative braking system to recharge the energy storage system to a desired level during and by the end of the regeneration region.

In some implementations, the controller controls the regenerative braking system such that its maximum amount of kinetic energy is captured during the regeneration region. In some implementations, the controller is configured to operate the one or more electric motors of the electrified powertrain as negative/drag torque applicators. In some implementations, the desired level for the energy storage system is within a threshold amount from fully charged. In some implementations, the GPS and maps data includes a route that the electrified vehicle is traveling and a set of road parameters associated with each a plurality of road segments comprising the route.

In some implementations, the energy storage system is a high voltage battery system and the target stored energy is a target SOC of the high voltage battery system. In some implementations, the controller is configured to utilize the regenerative braking system during an entirety of the regeneration region and not utilize a conventional friction braking system of the electrified vehicle during the regeneration region. In some implementations, the controller is configured to not intentionally enable one or more accessory loads of the electrified vehicle to intentionally further enable regenerative braking during the regeneration region. In some implementations, the electrified vehicle is an EREV. In some implementations, the EREV is a pickup truck.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, when an electrified vehicle's battery system state of charge (SOC) is full or near full when an extended downhill region is encountered, regenerative braking cannot occur because there is nowhere for the captured electrical energy to be stored. In other words, while thermal energy can be stored or generated (by combustion or electrical generation), the thermal energy cannot effectively be converted to other energy sources such as into electricity using thermo-electric devices other than regenerative braking. Thus, the thermal energy generated by the electrified vehicle's conventional friction brakes by braking during the downhill region would be lost to the environment, which also increases the wear of the friction brakes and potentially reduces their useful life. Disabling regenerative braking also provides an inconsistent driving experience for the customer. One possible solution is to utilize strategies to increase accessory loads to offer at least partial regenerative braking when battery state of charge is high. This could also result in an undesirable inconsistent driving experience and possibly customer discomfort (e.g., if the heater were enabled in hot ambient conditions). Further, in many cases this partial regeneration is insufficient to control vehicle speed and acceleration to the desired level without utilizing friction brakes as a supplement.

Accordingly, the present application is directed to techniques that predictively deplete an energy storage system (e.g., a high voltage battery system) in advance of a regeneration region (e.g., an extended downhill region satisfying a set of criteria) being encountered by the electrified vehicle. These techniques generally involve predictive command or control of electrified burn or "e-burn" prior to the upcoming regeneration region such that the regenerative braking system of the electrified vehicle does not need to be disabled and there is no leftover braking energy by the end of the regeneration region. These techniques avoid the drawbacks of the above-described conventional solutions that require utilizing components (friction brakes, accessory loads, etc.) in ways which they were not intended or designed for, as well as potentially requiring/adding new components such as resistor banks for thermal energy dissipation, which need to be packaged and wiring harness routed to control them thereby increasing weight/packaging and costs. These techniques also leverage global positioning satellite (GPS) system and maps data to intelligently and proactively manage energy storage in anticipation of such regeneration regions, potentially reducing vehicle costs for the reasons described above with respect to the existing/conventional solutions.

Figure 1:
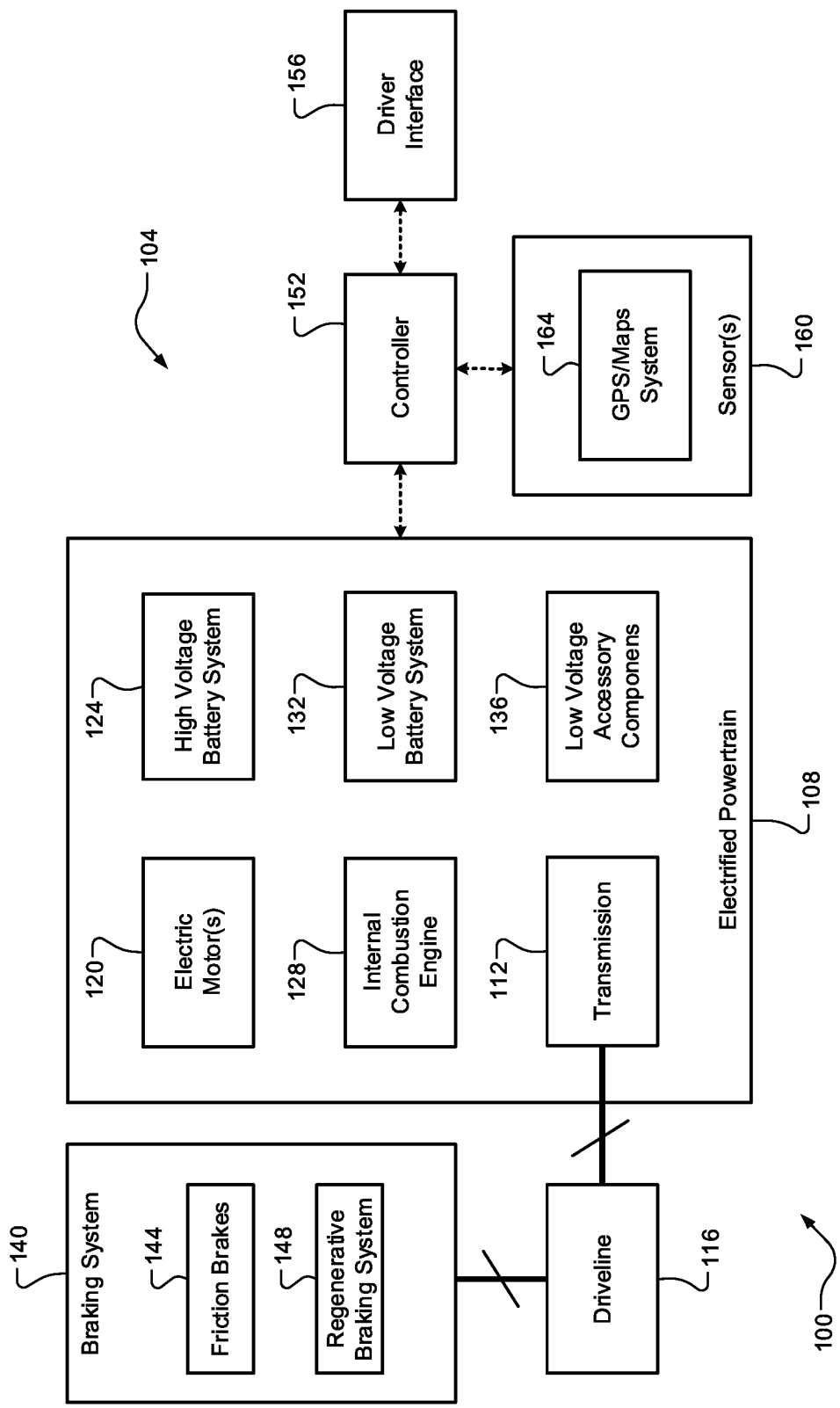
FIG. 1 is a functional block diagram of an electrified vehicle having an example predictive energy storage management system according to the principles of the present application.

Referring now to FIG. 1, a functional block diagram of an electrified vehicle 100 having an example predictive energy storage management system 104 according to the principles of the present application is illustrated. In one exemplary implementation, the electrified vehicle 100 is an extended range electrified vehicle (EREV), such as a light duty or heavy duty EREV pickup truck (e.g., capable of towing a substantial payload). These techniques could be particularly applicable to EREVs because they often traverse longer distances per full charge and, in the case of an EREV pickup truck, they could be hauling heavy payloads or towing up/down extended grades. An EREV-type pickup truck could be unexpected to many consumers as these types of vehicles are typically powered by large gasoline or diesel engines, and thus this configuration presents a unique opportunity for new market share. That said, the electrified vehicle 100 could be any suitable electrified vehicle (plug-in hybrid electric vehicle (PHEV), battery electric vehicle (BEV), etc.) and recharging of the electrified vehicle 100 via electrified vehicle supply equipment (EVSE) including a separate residential or roadside charging station (not shown).

While a battery-equipped electrified vehicle 100 is shown and generally described herein, it will be appreciated that the techniques of the present application are not limited to battery systems and are applicable to any suitable energy storage system. Thus, the term "energy storage system" as used herein could also be applicable to, for example, fuel cell electrified vehicles (FCEVs), which have hydrogen (H2) as stored energy. A FCEV, however, is a range extender system, as the disclosed electrified vehicle 100 may be as well (i.e., an REEV), which has a gasoline-powered generator (e.g., an internal combustion engine) converting liquid gasoline (or diesel) to electricity while the FCEV has a fuel cell system converting H2 to electricity. The proposed techniques provide optimized control for a vehicle's total energy storage system comprising any of chemical, electrical, pneumatic, thermal, kinetic, and potential energy—where some could be unidirectional (e.g., gasoline or diesel) and some could be bi-directional (electrical, pneumatic, etc.). The "target SOC" for the "battery system" as discussed herein throughout could therefore also refer to a "target capacity" or "target stored energy" of the "energy storage system."

The electrified vehicle 100 is powered by an electrified powertrain 108 that generates and transfers drive torque (e.g., via a transmission 112, such as a multi-speed automatic transmission) to a driveline 116. The electrified powertrain 108 includes one or more electric motors 120 powered by a high voltage battery system 124 and an optional internal combustion engine 128 configured to combust a mixture of air and fuel (diesel, gasoline, etc.). In other words, as the one or more electric motors 120 are operated to generate drive torque (torque consumer mode), the SOC of the high voltage battery system 124 is depleted. The electrified powertrain 108 also includes a low voltage battery system 132 (e.g., a 12 volt lead-acid or lithium-ion battery system) configured to power low voltage accessory loads 136 of the electrified vehicle 100 (pumps, fans, displays, etc.). The electrified powertrain 108 also includes a braking system 140 comprising a conventional friction braking system 144 and regenerative braking system 148. The regenerative braking system 148 is configured to brake (decelerate) the driveline 116 and convert the kinetic energy to electrical energy, such as for recharging the high voltage battery system 124.

A direct current (DC) to DC converter (not shown) or other suitable system could be implemented between the high and low voltage battery systems 124, 132 for stepping up/down respective DC voltages (e.g., for recharging therebetween). A controller 152 controls operation of the electrified vehicle 100, including controlling the electrified powertrain 108 to satisfy a torque request (e.g., via a driver interface 156, such as an accelerator pedal). It will be appreciated that the torque request may not come directly from the driver, but instead could be a torque request generated by an advanced driver assistance (ADAS) or autonomous driving system. The controller 152 is also configured to receive information from a set of sensors 160 to control operation of the electrified vehicle 100. Non-limiting examples of the set of sensors 160 include vehicle speed/altitude sensors, electrified powertrain speed/temperature/electrical parameter/SOC sensors, and a GPS/maps system 164. The GPS/maps system 164 could include a global navigation satellite system (GNSS) transceiver (not shown) configured to determine a precise geo-location of the electrified vehicle 100 (e.g., precise coordinates of the electrified vehicle 100).

The GPS/maps system 164 could also be configured to determine and localize the position of the electrified vehicle 100 relative to a map, such as a high-definition (HD) map. Map data could be stored remotely (e.g., at a remote server), locally (e.g., at the controller 152), or some combination thereof. The map data includes, among other things, a plurality of road segments each having varying road attributes (length, speed limit, curvature, elevation, grade, etc.). A route for the electrified vehicle 100 could include a plurality of these road segments from a start point to a desired end point. This route could be user-specified (e.g., via a driver input) or based on historical data/patterns, such as when/where the driver normally drives the electrified vehicle 100. In some implementations, the electrified vehicle 100 is configured to perform eco-routing, which refers to a process of minimizing battery system SOC consumption based on road attributes associated with the various road segments. For example, during eco-routing, stop signs and congested traffic regions could be avoided. The controller 152 is also configured to perform at least a portion of these predictive energy management control techniques of the present application, which will now be described in greater detail with reference to a method flowchart.

Figure 2:
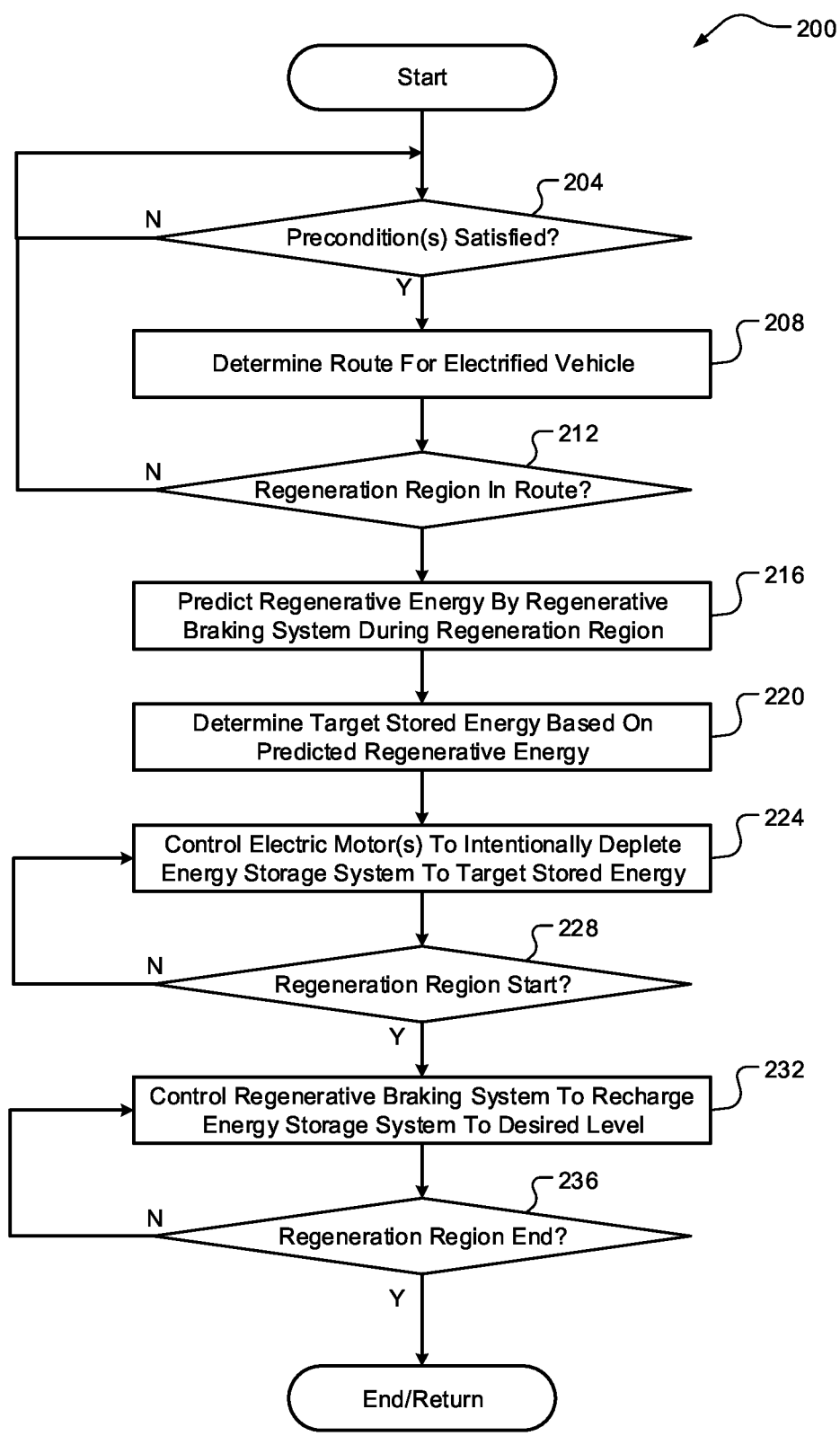
FIG. 2 is a flow diagram of an example predictive energy storage management method for an electrified vehicle according to the principles of the present application.

Referring now to FIG. 2 and with continued reference to FIG. 1, a flow diagram of an example predictive energy storage control method 200 for an electrified vehicle according to the principles of the present application is illustrated. While the electrified vehicle 100 and its components are specifically referenced for illustrative/descriptive purposes, it will be appreciated that the method 200 could be applicable to any suitably configured electrified vehicle. At 204, the controller 152 determines whether an optional set of one or more preconditions are satisfied. This could include, for example only, the electrified vehicle 100 being powered up and running, sufficient communication/connectivity by the GPS/maps system 164, and/or there being no malfunctions or faults present that would otherwise affect the operation of the method 200 and the electrified vehicle 100. When false, the method 200 ends or returns to 204. When true, the method 200 continues to 208. At 208, the controller 152 determines a route for the electrified vehicle 100. This route could be provided by the driver or could be based on prediction by the controller 152 (e.g., a most-likely route based on past driving behavior among other things). At 212, the controller 152 detects whether there is an upcoming (future) regeneration region in the route. When false, the method 200 ends or returns to 204.

When there is an upcoming regeneration region, the method 200 continues to 216. The term "regeneration region" as used herein (previously and here forth) refers to a downhill grade or region satisfying a set of criteria that the electrified vehicle 100 will encounter and traverse in the future (along its current route). This set of criteria could include, for example, the downhill region being at least a threshold length (e.g., a kilometer or number of kilometers) and having at least a threshold downgrade (e.g., 15% downgrade). It will be appreciated that these are merely example thresholds/percentages for descriptive purposes and that these criteria are definable and calibratable such that the techniques of the present disclosure do not activate to proactively deplete the battery system's SOC in advance of very short/minimal downhill regions that would not have a significant impact (via recaptured SOC by the regenerative braking system 148). At 216, the controller 152 predicts a regenerative energy that a regenerative braking system 148 of the electrified vehicle 100 can generate across the regeneration region. This "regenerative energy" represents how much energy (electrical current) is capturable by the regenerative braking system 148 during the upcoming regeneration region, given current operating conditions (vehicle speed, temperature, etc.).

As previously mentioned, this includes not utilizing the conventional friction braking system 144 of the electrified vehicle 100 during the regeneration region and not intentionally enable one or more of the accessory load(s) 136 of the electrified vehicle 100 to intentionally further enable regenerative braking during the regeneration region. At 220, the controller 152 determines a target stored energy for the energy storage system of the electrified vehicle 100 based on the predicted regenerative energy. For example, the controller 152 could determine a target SOC for the high voltage battery system 124. At 224, the controller 152 controls the one or more electric motors 120 of the electrified powertrain 108 to intentionally deplete the energy storage system to the target stored energy by the start of the regeneration region. In other words, the electric motor(s) 120 are commanded to operate as drag or negative forces on the driveline 116 to intentionally deplete stored energy. At 228, the controller 152 determines whether the regeneration region has been reached and is starting, at which the energy storage system will be at the target stored energy. When false, the method 200 returns to 224. When true, the method 200 proceeds to 232.

At 232, the controller 152 controls the regenerative braking system 148 to recharge the energy storage system to a desired level during and by the end of the regeneration region. The desired level could be within a threshold amount from fully recharged (96%, 98%, etc.) or fully recharged (e.g., 100%). More specifically, the regenerative braking system 148 converts kinetic energy of the electrified vehicle 100 to electrical energy to fully recharge the high voltage battery system 124 during and by the end of the regeneration region such that it reaches its maximum desired SOC (e.g., 100% or slightly less than 100%). This could include, for example, not disabling the regenerative braking system 148 until the end of the regeneration region such that no energy is wasted. At 236, the controller 152 determines whether the electrified vehicle 100 has traversed the regeneration region. When false, the method 200 returns to 232 and continues. When true, control returns to normal and the method 200 ends or returns to 204 and the process could continue for other potential regeneration regions along the route. For multiple regeneration regions, however, the proactive control of the electrified powertrain 108 could be performed for the entire vehicle trip (e.g., the entire expected route) such that the SOC of the high voltage battery system 124 may not reach maximum (e.g., 100% SOC) after an initial or intermediate regeneration region but will do so after a final regeneration region of the current vehicle route/trip.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A predictive energy storage management system for an electrified vehicle, the predictive energy storage management system comprising:
    a set of sensors configured to obtain a set of global positioning satellite (GPS) and map data associated with a current trip of the electrified vehicle; and
    a controller configured to receive, from the set of sensors, the set of GPS and map data and, based on the set of GPS and map data:
        detect an upcoming regeneration region that the electrified vehicle will encounter, the regeneration region satisfying a set of criteria;
        predict a regenerative energy that a regenerative braking system of the electrified vehicle can generate across the regeneration region;
        determine a target stored energy for an energy storage system of the electrified vehicle based on the predicted regenerative energy;
        control one or more electric motors of an electrified powertrain of the electrified vehicle to intentionally deplete the energy storage system to the target stored energy by the start of the regeneration region; and
        control the regenerative braking system to recharge the energy storage system to a desired level during and by the end of the regeneration region.

2. The predictive energy storage management system of claim 1, wherein the controller controls the regenerative braking system such that its maximum amount of kinetic energy is captured during the regeneration region.

3. The predictive energy storage management system of claim 1, wherein the controller is configured to operate the one or more electric motors of the electrified powertrain as negative/drag torque applicators.

4. The predictive energy storage management system of claim 1, wherein the desired level for the energy storage system is within a threshold amount from fully charged.

5. The predictive energy storage management system of claim 1, wherein the GPS and maps data includes a route that the electrified vehicle is traveling and a set of road parameters associated with each a plurality of road segments comprising the route.

6. The predictive energy storage management system of claim 1, wherein the energy storage system is a high voltage battery system and the target stored energy is a target state of charge (SOC) of the high voltage battery system.

7. The predictive energy storage management system of claim 1, wherein the controller is configured to utilize the regenerative braking system during an entirety of the regeneration region and not utilize a conventional friction braking system of the electrified vehicle during the regeneration region.

8. The predictive energy storage management system of claim 7, wherein the controller is configured to not intentionally enable one or more accessory loads of the electrified vehicle to intentionally further enable regenerative braking during the regeneration region.

9. The predictive energy storage management system of claim 1, wherein the electrified vehicle is an extended range electrified vehicle (EREV).

10. The predictive energy storage management system of claim 9, wherein the EREV is a pickup truck.

11. A predictive energy storage management method for an electrified vehicle, the predictive energy storage management method comprising:
    receiving, by a controller and from a set of sensors, a set of global positioning satellite (GPS) and map data associated with a current trip of the electrified vehicle;
    based on the received GPS and map data, detecting, by the controller, an upcoming regeneration region that the electrified vehicle will encounter, the regeneration region satisfying a set of criteria;
    based on the received GPS and map data, predicting, by the controller, a regenerative energy that a regenerative braking system of the electrified vehicle can generate across the regeneration region;
    determining, by the controller, a target stored energy for an energy storage system of the electrified vehicle based on the predicted regenerative energy;
    controlling, by the controller, one or more electric motors of an electrified powertrain of the electrified vehicle to intentionally deplete the energy storage system to the target stored energy by the start of the regeneration region; and
    controlling, by the controller, the regenerative braking system to recharge the energy storage system to a desired level during and by the end of the regeneration region.

12. The predictive energy storage management method of claim 11, wherein the controller controls the regenerative braking system such that its maximum amount of kinetic energy is captured during the regeneration region.

13. The predictive energy storage management method of claim 11, wherein the controller is configured to operate the one or more electric motors of the electrified powertrain as negative/drag torque applicators.

14. The predictive energy storage management method of claim 11, wherein the desired level for the energy storage system is within a threshold amount from fully charged.

15. The predictive energy storage management method of claim 11, wherein the GPS and maps data includes a route that the electrified vehicle is traveling and a set of road parameters associated with each a plurality of road segments comprising the route.

16. The predictive energy storage management method of claim 11, wherein the energy storage system is a high voltage battery system and the target stored energy is a target state of charge (SOC) of the high voltage battery system.

17. The predictive energy storage management method of claim 11, wherein the controller is configured to utilize the regenerative braking system during an entirety of the regeneration region and not utilize a conventional friction braking system of the electrified vehicle during the regeneration region.

18. The predictive energy storage management method of claim 17, wherein the controller is configured to not intentionally enable one or more accessory loads of the electrified vehicle to intentionally further enable regenerative braking during the regeneration region.

19. The predictive energy storage management method of claim 11, wherein the electrified vehicle is an extended range electrified vehicle (EREV).

20. The predictive energy storage management method of claim 19, wherein the EREV is a pickup truck.

\* \* \* \* \*